(12) United States Patent
Shin

(10) Patent No.: US 7,641,255 B2
(45) Date of Patent: Jan. 5, 2010

(54) HOUSING TYPE CUP HOLDER FOR A VEHICLE

(75) Inventor: Je Hoon Shin, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 581 days.

(21) Appl. No.: 11/641,442

(22) Filed: Dec. 19, 2006

(65) Prior Publication Data

US 2008/0110909 A1 May 15, 2008

(30) Foreign Application Priority Data

Nov. 14, 2006 (KR) .............. 10-2006-0112186

(51) Int. Cl.
*B60R 11/06* (2006.01)
(52) U.S. Cl. .................... 296/37.1; 248/311.2
(58) Field of Classification Search ............. 296/37.1, 296/37.12, 37.8; 220/737; 224/96; 248/311.2
See application file for complete search history.

(56) References Cited

U.S. PATENT DOCUMENTS

| | | | |
|---|---|---|---|
| 4,733,908 A * | 3/1988 | Dykstra et al. | 248/311.2 |
| 4,759,584 A * | 7/1988 | Dykstra et al. | 297/188.16 |
| 4,854,536 A * | 8/1989 | Lorence et al. | 248/311.2 |
| 4,943,111 A * | 7/1990 | VanderLaan | 248/311.2 |
| 5,171,061 A * | 12/1992 | Marcusen | 248/311.2 |
| 5,628,486 A * | 5/1997 | Rossman et al. | 248/311.2 |
| 5,692,718 A * | 12/1997 | Bieck | 248/311.2 |
| 5,876,007 A * | 3/1999 | Lancaster et al. | 248/311.2 |
| 6,059,243 A * | 5/2000 | Hikage et al. | 248/311.2 |
| 6,575,542 B2 * | 6/2003 | Shimajiri | 224/281 |
| 7,140,660 B2 * | 11/2006 | Oana | 296/37.8 |
| 2002/0008415 A1 * | 1/2002 | Bollaender et al. | 297/188.17 |

FOREIGN PATENT DOCUMENTS

| | | |
|---|---|---|
| JP | 07-291012 | 11/1995 |
| KR | 1997-0074223 | 12/1997 |
| KR | 1998-0018022 | 6/1998 |
| KR | 1020020048620 A | 6/2002 |
| KR | 1020050041216 A | 5/2005 |

* cited by examiner

*Primary Examiner*—Kiran B. Patel
(74) *Attorney, Agent, or Firm*—Morgan, Lewis & Bockius LLP

(57) ABSTRACT

A housing type cup holder includes: a holder housing in which a receiving part is formed; a holder including a main receiving part and a sub receiving part which is slidably connected to a lower portion of the main receiving part so as to descend by weight thereof when the main receiving part is drawn out and a holder support which includes a support lead having one end of which is connected through a hinge to the sub receiving part and the second end which is extended toward the inside of the holder housing; a support link which is connected through the hinge to the support lead and the second end which is housed in the receiving part in a state that the holder is drawn out, and a guide lead guiding the holder position of the support link.

7 Claims, 3 Drawing Sheets

HOUSING TYPE CUP HOLDER FOR A VEHICLE

CROSS-REFERENCE TO RELATED APPLICATION

This application claims priority to Korean Patent Application No. 10-2006-0112186 filed in the Korean Intellectual Property Office on Nov. 14, 2006, the disclosure of which is incorporated herein by reference.

BACKGROUND OF THE INVENTION (a) Field of the Invention

The present invention relates to a housing type cup holder for a vehicle.

(b) Description of the Related Art

A cup holder in a vehicle receives and holds a beverage container, a can, or a cup. A cup holder may be divided into a lead type cup holder and a housing type cup holder.

A lead type cup holder uses a foldable lead without separate housing. If a cup holder is opened, the lead is unfolded so as to form a cup holder. If a cup holder is closed, the lead is folded so that the cup holder is housed.

In a housing type cup holder, a cup holder which can be opened and closed, like a drawer, is mounted to a separate housing. The cup holder can be drawn out for use, and after use, the cup holder is pushed into the housing. However, the housing type cup holder can be unstable when a vehicle is in motion.

Therefore, the present invention provides a housing type cup holder for a vehicle with an improved structure of holding a beverage container or can with an increased depth of receiving space of the cup holder so as to enhance stability of the cup or container.

SUMMARY OF THE INVENTION

In one embodiment, the present invention provides a housing type cup holder comprising: a holder housing which is installed within a cabin of a vehicle and in which a receiving part is formed; a holder which is housed in the holder housing and is configured to receive a beverage container and a cup in which the holder comprises a main receiving part which is opened and a sub receiving part which is slidably connected to a lower portion of the main receiving part so as to descend by weight thereof when the main receiving part is drawn out and a bottom of which is closed; a holder support including a support lead which is connected through a hinge to an end of the sub receiving part and the second end of which is extended toward the inside of the holder housing; a support link in which one end is connected through a hinge to an end of the support lead and the second end of which is housed in the receiving part in a state that the holder is drawn out; and a guide lead which is fixed to an inside of the receiving part and guides the receipt position of the support link.

In another embodiment, the support link may be formed in a shape of a hollow cylinder and receives the guide lead. If the holder is pushed to move into the holder housing, the support link is pushed to move into the receiving part by the support lead so as to be slidably coupled to the guide lead thereby raising the sub receiving part toward the main receiving part.

In another embodiment, an outer circumference of the sub receiving part may contact an inner circumference of the main receiving part and a plurality of sliding projections which are extended outward may be formed on an upper portion of the outer circumference of the sub receiving part.

In another embodiment, a plurality of sliding slots receiving the sliding projections may be formed in the main receiving part along a lengthwise direction thereof.

In another embodiment, the sliding slot may be formed to have the length correspond to the height of the sub receiving part.

Figure 1:
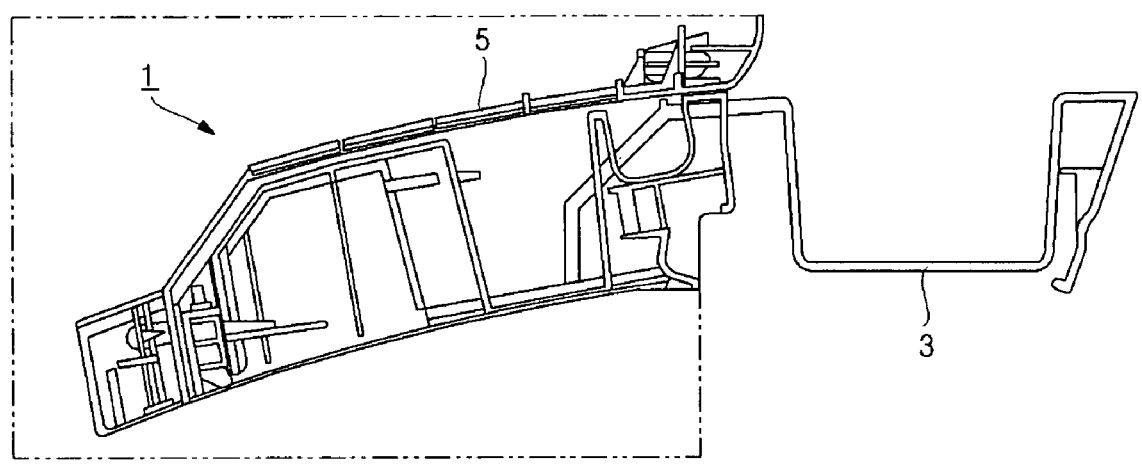
FIG. 1 is a cross sectional view of a conventional housing type cup holder.

<Description of Reference Numerals Indicating Primary Elements in the Drawings>

| | |
|---|---|
| 100: housing type cup holder | 110: holder housing |
| 112: receiving part | 120: holder |
| 122: main receiving part | 122a: slot |
| 124: sub receiving part | 124a: sliding projection |
| 130: holder supporter | 132: support lead |
| 134: support link | 136: guide lead |
| 138: hinge | |

DETAILED DESCRIPTION OF THE EMBODIMENTS

An exemplary embodiment of the present invention will hereinafter be described in detail with reference to the accompanying drawings.

Figure 2:
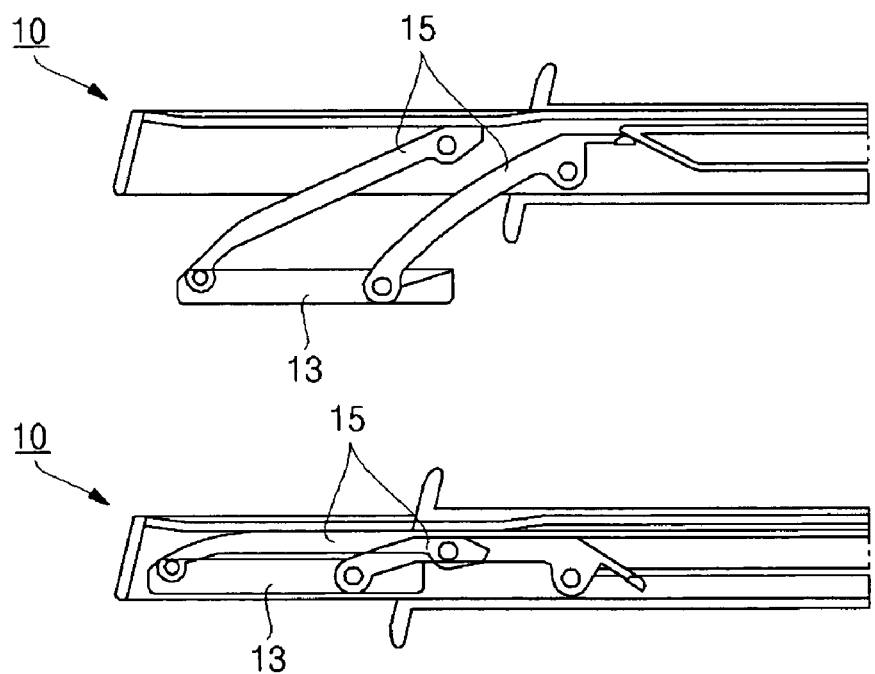
FIG. 2 is a cross sectional view of a conventional lead type cup holder.

FIG. 1 is a cross sectional view of a conventional housing type cup holder. FIG. 2 is a cross sectional view of a conventional lead type cup holder.

As shown in FIG. 1, a conventional housing type cup holder 1 has an advantage over a lead type in that the movement of a receiving part 3 is relatively small. Since the depth of the receiving part 3 links directly with the size of a housing 5, manufacturing cost and weight are increased.

As shown in FIG. 2, a conventional lead type cup holder 10 has an advantage over the housing type cup holder in that it requires relatively small mounting space. However, when the cup holder 13 is opened, a lead 15 may be easily moved, and the depth of a receiving space is small according to an operating structure of a lead so that there is a disadvantage in receiving a cup.

Figure 3:
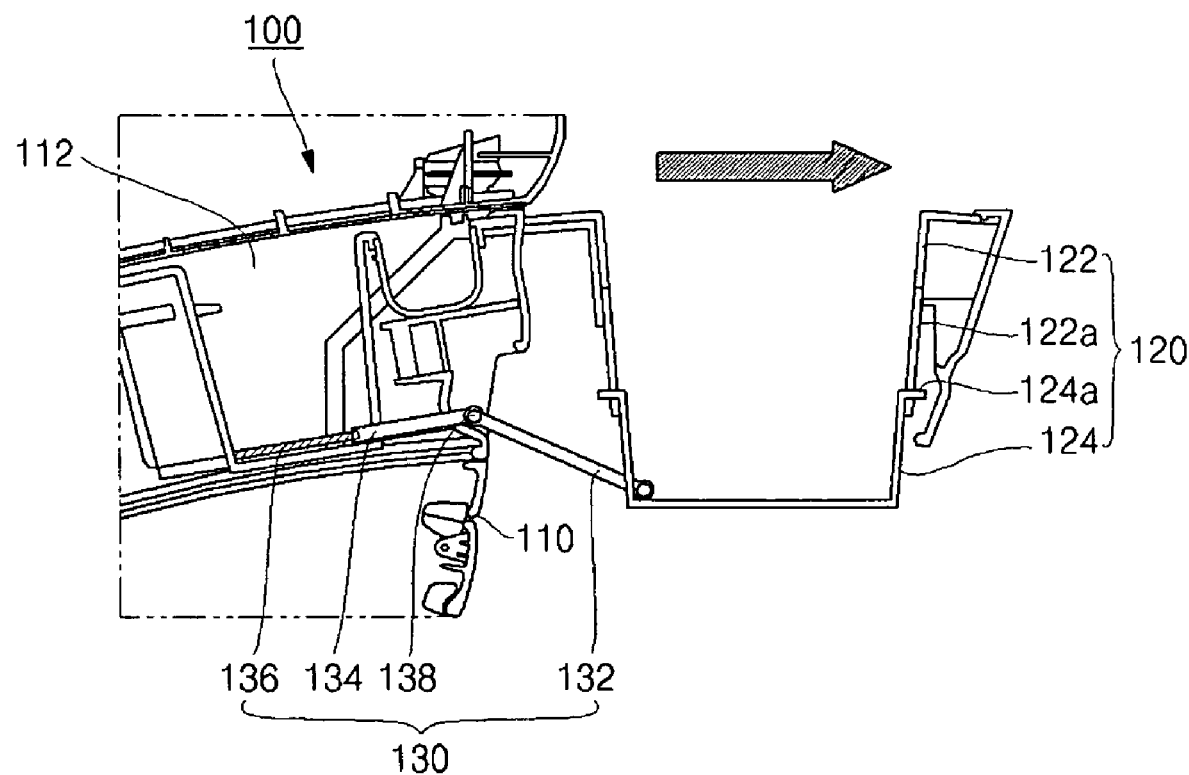
FIG. 3 is a cross sectional view of a housing type cup holder according to an exemplary embodiment of the present invention.
Figure 4:
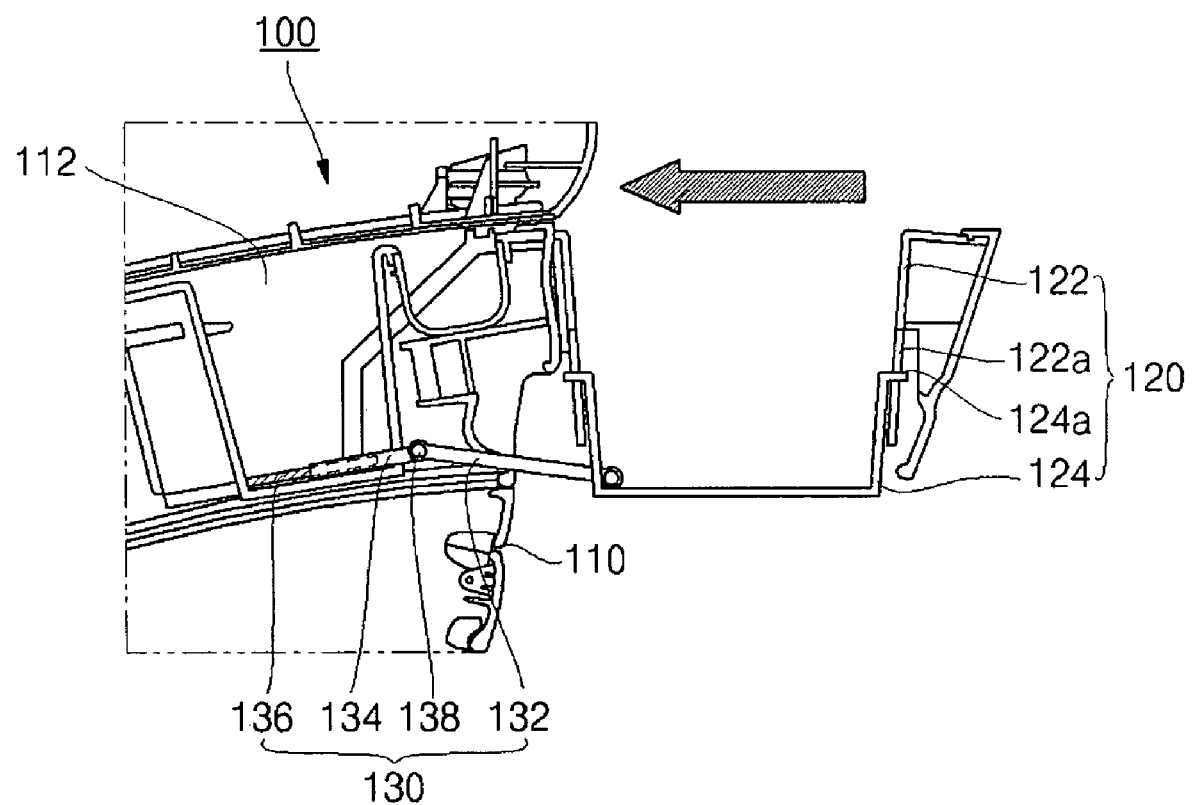
FIG. 4 is a cross sectional view of a housing type cup holder in a state of being housed according to an exemplary embodiment of the present invention.

As shown in FIG. 3 and FIG. 4, a housing type cup holder 100 according to an exemplary embodiment of the present invention includes: a holder housing 110 which is installed within a cabin of a vehicle; a holder member 120 which is provided to be housed in the holder housing 110 and receives a beverage container or a cup; and a holder supporter 130 supporting the holder member 120.

The holder housing 110 may be installed at a rear portion of a console box which is disposed between a driver seat and a front passenger seat or to a lower portion of an instrument panel and a receiving part 112 for housing the holder member 120 is formed in the holder housing 110.

The receiving part 112 is formed to have a shape corresponding to a shape of the holder member 120. The holder member 120 is ordinarily housed within the receiving part 112, and if it is necessary to use the holder member 120, a user draws out the holder member 120 from the receiving part 112.

The holder member 120 includes a main receiving part 122 and a sub receiving part 124, in which the sub receiving part 124 is disposed below the main receiving part 122.

The main receiving part 122 has the shape of a hollow cylinder when it is opened. An outer circumference of the sub receiving part 124 contacts an inner circumference of the main receiving part 122.

A plurality of sliding slots 122a are formed on an outer surface of the main receiving part 122 along a lengthwise direction thereof, and a plurality of sliding projections 124a are slidably fitted into the sliding slots 122a. It is preferable that the length of the sliding slot 122a corresponds to the length of the sub receiving part 124 because the sub receiving part 124 should be housed within the receiving part 112 of the holder housing 110 in a state that the sub receiving part 124 is housed within the main receiving part 122.

The sub receiving part 124 has the shape of hollow cylinder when it is closed. The sub receiving part 124 is housed within the main receiving part 122, and if the holder member 120 is drawn out, the sub receiving part 124 slides down from the main receiving part 122 by its own weight.

A plurality of the sliding projections 124a is formed at an upper outer circumference of the sub receiving part 124. The sliding projections 124a protrude out of the sub receiving part 124 so as to be inserted into the sliding slots 122a of the main receiving part 122. While the sub receiving part 124 descends, the sliding projections 124a move down along a lengthwise direction of the sliding slot 122a. In the meantime, the sub receiving part 124 rises and the sliding projections 124a move upward along a lengthwise direction of the sliding slot 122a.

If the sub receiving part 124 is deployed downward from the main receiving part 122 by weight thereof, the depth of the receiving space becomes deeper, so a beverage container or a cup can be stably received.

Meanwhile, as shown in FIG. 3 and FIG. 4, the holder member 120 is supported by the holder supporter 130, and if a user pushes the holder member 120 so as to house the holder member 120 within the receiving part 112 after use of the holder member 120 is completed, the sub receiving part 124 is raised by the holder supporter 130 so as to be folded within the main receiving part 122.

The holder supporter 130 includes: a support lead 132 supporting the sub receiving part 124; a support link 134 which is connected to the support lead 132; and a guide lead 136 which is inserted into the support link 134.

The support lead 132 is bar-shaped. One end of the support lead 132 is rotatably connected to an end of the sub receiving part 124; in other words, it is connected to an end of the receiving part 112 of the holder housing 110 by a hinge 138. The second end of the support lead 132 is extended toward the receiving part 112 and supports the sub receiving part 124.

The support link 134 is bar-shaped and is formed as a hollow cylinder. One end of the support link 134 is connected to the support lead 132 by the hinge 138, and the second end of the support link 134 is opened so as to receive the guide lead 136 which is installed within the receiving part 112.

One end of the guide lead 136 is fixed to the inside of the receiving part 112, and the second end of the guide lead 136 is extended toward the support link 134. When the holder member 120 is drawn out, the guide lead 136 is drawn out from the support link 134. When the holder member 120 is inserted into the receiving part 112, the guide lead 136 is inserted into the support link 134. At this time, when the guide lead 136 is drawn out from the support link 134, the guide lead 136 is not completely separated from the support link 134.

The operations of a cup holder according to an exemplary embodiment of the present invention will be explained hereinafter.

As shown in FIG. 3, when a user uses the housing type cup holder 100 according to an exemplary embodiment of the present invention, the holder member 120 is first drawn out from the receiving part 112 of the holder housing 110.

The holder member 120 includes the main receiving part 122 and the sub receiving part 124. When the holder member 120 is drawn out, the sub receiving part 124 slides down by its own weight so as to escape from the main receiving part 122. Therefore, the sub receiving part 124 is dipped below from the main receiving part 122.

At this time, the support lead 132 which is connected to the sub receiving part 124 is thereby drawn out to the outside of the receiving part 112 of the holder housing 110. The support link 134 which is connected to the support lead 132 is also drawn out toward the outside of the receiving part 112 and is hooked to an end of the guide lead 136, thereby supporting the holder member 120.

Since the sub receiving part 124 comes out of the main receiving part 122, the depth of the receiving space for receiving a beverage container or a cup is increased. Accordingly, the stability of cup holder is enhanced.

As shown in FIG. 4, after use of the housing type cup holder 100 is completed, a user pushes the holder member 120 which is inserted into the receiving part 112 of the holder housing 110.

During this process, if the holder member 120 is pushed toward the receiving part 112, the support lead 132 is moved inside the receiving part 112 so as to push the support link 134. The support link 134 is pushed inside of the receiving part 112 while receiving the guide lead 136 therein.

Since the support lead 132 is rotatably connected to the sub receiving part 124 and the support lead 132 is rotatably connected to the support link 134, if the holder supporter 130 moves into the receiving part 112 of the holder housing 110, the holder member 120 also moves into the receiving part 112.

In other words, the support link 134 moves into the receiving part 112 so as to raise the support lead 132, and the support lead 132 raises the sub receiving part 124 like a lever so that the sub receiving part 124 is automatically housed in the main receiving part 122. However, a separate structure such as a supporting projection is not provided, and the outside of the bottom of the receiving part 112 serves as a member of supporting the support lead 132.

Since the plurality of the sliding projections 124a are formed on an outer circumference of the sub receiving part 124 and are inserted into the sliding slots 122a which are formed in the main receiving part 122, the sub receiving part 124 can move smoothly along the sliding slot 122a when the sub receiving part 124 is raised by the support lead 132.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A housing type cup holder comprising:
   a holder housing which is installed within a cabin of a vehicle and in which a receiving part is formed;

a holder member which is housed in the holder housing and is configured to receive a beverage container or a cup, wherein the holder member includes a main receiving part which is opened and a sub receiving part which is slidably connected to a lower portion of the main receiving part so as to descend by weight thereof when the main receiving part is drawn out; and a holder support including a bar-shaped support lead in which one end is connected through a hinge to an end of the sub receiving part and the second end which is extended toward the inside of the holder housing;

a bar-shaped support link in which one end is connected through a hinge to an end of the support lead and the second end which is housed in the receiving part in a state that the holder member is drawn out; and a bar-shaped guide lead having a shape of a bar which is fixed to an inside of the receiving part and guides holding position of the support link.

2. The housing type cup holder of claim 1, wherein the support link receives the guide lead, and if the holder member is pushed into the holder housing, the support link is pushed into the receiving part by the support lead so as to be slidably coupled to the guide lead, thereby raising the sub receiving part toward the main receiving part.

3. The housing type cup holder of claim 1, wherein an outer circumference of the sub receiving part contacts an inner circumference of the main receiving part and a plurality of sliding projections which protrude out are formed on an upper portion of the outer circumference of the sub receiving part.

4. The housing type cup holder of claim 1, wherein a plurality of sliding slots receiving the sliding projections are formed in the main receiving part along a lengthwise direction thereof.

5. The housing type cup holder of claim 3, wherein a plurality of sliding slots receiving the sliding projections are formed in the main receiving part along a lengthwise direction thereof.

6. The housing type cup holder of claim 4, wherein the sliding slot is formed to have length corresponding to a height of the sub receiving part.

7. The housing type cup holder of claim 5, wherein the sliding slot is formed to have length corresponding to a height of the sub receiving part.

* * * * *